United States Patent [19]

Johnson et al.

[11] Patent Number: 4,863,613
[45] Date of Patent: Sep. 5, 1989

[54] SOY PROTEIN ISOLATION PROCESS USING SWELLABLE POLY(N-ISOPROPYLACRYLAMIDE) GELS

[75] Inventors: Dale W. Johnson, Golden Valley; Edward L. Cussler, Edina, both of Minn.; Steven J. Trank, Portage, Mich.

[73] Assignee: Regents of the University of Minnesota, Minneapolis, Minn.

[21] Appl. No.: 257,078

[22] Filed: Oct. 13, 1988

Related U.S. Application Data

[63] Continuation-in-part of Ser. No. 128,959, Dec. 8, 1987, which is a continuation of Ser. No. 791,522, Oct. 25, 1985, abandoned.

[51] Int. Cl.[4] .............................................. B01D 15/00
[52] U.S. Cl. ..................... 210/670; 210/689; 210/712; 210/772; 210/774; 210/806; 210/905; 530/378; 530/415
[58] Field of Search ................ 210/634, 635, 642, 644, 210/648, 670, 673, 674, 689, 734, 905, 806, 712, 774, 772; 530/378, 412, 415

[56] References Cited

U.S. PATENT DOCUMENTS

| | | | |
|---|---|---|---|
| 3,925,017 | 5/1973 | Updike | 210/635 |
| 4,555,344 | 11/1985 | Cussler | 210/670 |
| 4,658,745 | 4/1972 | Merrill et al. | 210/689 |
| 4,697,004 | 9/1985 | Puski et al. | 530/378 |

FOREIGN PATENT DOCUMENTS

WO87/06152 10/1987 PCT Int'l Appl. .

OTHER PUBLICATIONS

Peppas and Merrill, *J. Biomed. Mater. Res.*, 11, 243 (1977).
Merrill et al., *J. Appl. Physiol.*, 29, 723 (1970).
*Chem. & Eng. News*, 41 (May 5, 1986).
R. Freitas and E. Cussler, *Chem. Eng. Science*, 42, 97 (1987).
S. H. Gehrke et al., *Chem. Eng. Science*, 41, 2153 (1987).
S. J. Trank and E. L. Cussler, *Chem. Eng. Science*, 42, 381 (1987).

*Primary Examiner*—W. Gary Jones
*Attorney, Agent, or Firm*—Merchant, Gould, Smith, Edell, Welter & Schmidt

[57] ABSTRACT

A method is provided for the purification and concentration of soy protein comprising mixing an aqueous solution including soy protein along with other water soluble moieties including sugars, salts, and phytins with a solid crosslinked polymer gel selected from the group consisting of N-substituted polyacrylamides and copolymers of N-substituted polyacrylamides; swelling the gel to absorb a portion of the water and other water soluble moieties including sugars, salts, and phytins from the aqueous solution by substantially maintaining the temperature of the gel at a preselected temperature below the lower critical solution temperature of the gel, to yield a concentrated soy protein solution; and separating the concentrated soy protein solution from the swollen gel. The concentrated soy protein solution may be repeatedly subjected to the gel treatment depending on the desired purity of the protein and the desired solids concentration.

15 Claims, 3 Drawing Sheets (a) Van der Waals (b) Gels Used Here

SOY PROTEIN ISOLATION PROCESS USING SWELLABLE POLY(N-ISOPROPYLACRYLAMIDE) GELS

CROSS REFERENCE TO RELATED APPLICATION

This application is a continuation-in-part of U.S. application Ser. No. 128,959, filed Dec. 8, 1987; which is a continuation of U.S. application Ser. No. 791,522, filed Oct. 25, 1985, abandoned.

TECHNICAL FIELD OF THE INVENTION

The present invention relates to a method for the purification and concentration of soy protein using crosslinked poly(N-isopropylacrylamide) gels which swell to absorb water and low molecular weight solutes while excluding the protein and other higher molecular weight solutes.

BACKGROUND OF THE INVENTION

Soybeans are a major food source for the United States, supplying 70-80% of its vegetable oil and over $350 million/year of edible protein products. Although most of this product exists as soy flour, about 12% of its total volume, and 50% of its value, lies in the soy protein isolate.

A typical process for isolating soy protein is shown in FIG. 1. Before entering the three-stage extractor, the raw soybeans are cracked, dehulled, and extracted with hexane to remove the soybean oil from the resulting soy flakes. The flakes are then desolventized and extracted in three stages with water at about pH 8.5 to disperse the protein and other soluble constituents present in the flakes. A centrifuge ($C_1$) separates spent flakes from the protein-rich mother liquor. The mother liquor contains water dispersible proteins, some of which are acid-precipitable (aglobulins), those which are acid soluble (albumins), oligosaccharides (sucrose, stachyose, raffinose, and the like), salts, phytin, and other constituents. The protein is subsequently precipitated from the mother liquor by adding a suitable acid such as HCl to adjust the pH to about 4.5, the approximate isoelectric point of the major protein components, to produce a protein curd. While removing much of the soy protein from the mother liquor, this treatment does not precipitate acid-soluble proteins such as albumins. A second centrifugation ($C_2$) separates the acidic liquor or "whey" from the protein-rich precipitate or "curd". The curd is then washed with water to remove any additional acidic whey, along with other soluble components in the whey, and is separated from the whey by a third centrifugation ($C_3$). The curd is redispersed by adjusting the pH to about 7 with suitable alkalies. The resulting dispersion, usually about 13-18% weight protein, is spray-dried to yield the soy protein isolate as a proteinate.

As a rough example based on using the equivalent of about 100 kg of moisture-free flakes, the existing soy protein isolation process produces about 33 kg of water insoluble spent flakes, 33 kg of dried protein isolate, and 33 kg of dissolved solids in the whey. The unprecipitated proteins present in the whey represent about 10% of the dispersible proteins present in the mother liquor. This failure to recover a substantial percentage of the protein in the soybeans reduces the utility of the existing process. More importantly, the loss of these proteins can compromise the functional and nutritional quality of the final product by affecting the overall protein composition. Additionally, these proteins contain a significant amount of phytin.

The flakes used for protein production are not sterile, and if produced under the best available conditions may have plate counts of under 25,000 microorganisms per gram of flakes. It is desirable to use flakes with as low a plate count as possible. All flakes must be essentially free of possible pathogens and common enteric organisms.

In the current processes, the extraction of the defatted flakes or flour to obtain the mother liquor is usually carried out at temperatures in the range of about 80° F. to 150° F. (27° to 66° C.). Further processing to separate the spent flakes from the mother liquor by centrifugation, precipitation of the curd, washing the curd and centrifugation to separate the curd from the whey and wash water, curd neutralization and other possible operations are carried out at temperatures of 80° F. to 120° F. (27° to 49° C.). The time period for the flake extraction may be 30 to 40 minutes for the initial extraction and an equal time for the subsequent washing of the extracted flakes. The subsequent operations (centrifugation, precipitation, curd washing, neutralization, and so forth) may require an additional 3 to 4 hours or more before the concentrated protein materials are dried. During that period of time, there may be a substantial increase in microbial population which can adversely affect the flavor, aroma, functionality, and color of the final product.

The temperatures used in the existing processing procedures are those which are generally ideal for the growth of many microorganisms. The protein solutions also contain ideal nutrients for microbial growth. When a given microbial population is exposed to conditions which promote growth, there is an initial "lag phase" in which there is little or no growth, after which the organisms begin to reproduce at an ever-increasing rate. Since the rate of growth of microorganisms is such that in short periods of time there is essentially a doubling of the microbial population, bacterial problems may result at the completion of processing even though only a small increase in microbial population was observed during the first hour or so. With dry products at low moisture levels below about 155 ppm, even though viable organisms may be present, they will not reproduce.

Assuming the bacterial count of the flakes is 1000/g, and assuming 8 parts of water per part of flake are used to make a slurry in order to prepare the mother liquor, the fresh slurry would have a count of about 125 organisms/ml. If it is assumed that the lag time is 15 minutes, after which the bacterial population doubles every 15 minutes, then after 15 minutes of extraction, the bacterial counts would be 125/ml; after 30 minutes, 250/ml; after 1 hour, 1000/ml; after 2 hours, 16,000/ml; after 3 hours, 256,000/ml; after 4 hours, 4,000,000/ml; after 5 hours, 66,000,000/ml; and so on. Depending on the types of organisms present and specific conditions of nutrient concentration, temperature, pH, and the like, the lag time and regeneration time could be somewhat less or considerably higher than in this example. Bacterial counts in the range of 1000-5000/ml would not be considered high, but counts in the several hundred thousand to the millions level per ml are undesirable.

Crosslinked poly(N-isopropylacrylamide) gels have been prepared which exhibit strongly temperaturedependent swelling when exposed to water. At low temperatures, these gels are in an expanded phase, and retain large amounts of water, along with any low molecular weight solutes which may be dissolved in the water. At only slightly higher temperatures, the gels undergo a phase transition whereby they contract in volume and exclude water and low molecular weight solutes, preferring interactions between the polymer molecules. These phase transitions involve an unusual form of critical point, a lower critical solution temperature (LCST).

The large changes in volume of crosslinked poly(N-isopropylacrylamide) gels which occur when the gels are heated or cooled through narrow temperature ranges can be analogized to the phase transition behavior of a van der Waals fluid, as shown in FIG. 2. FIG. 2(a) is a pressure-volume graph for a van der Waals fluid. Starting in the gas region at low pressures and raising the pressure at a constant temperature along the isotherm shown, the two-phase envelope is eventually reached at point A. The pressure corresponding to point A is the equilibrium vapor pressure at which the gas begins to condense and at which both gas and liquid coexist as separate phases. The fluid volume drops sharply as vapor condenses to a liquid.

The dotted horizontal line containing point A is the two-phase segment of but one of many isotherms that can exist for a van der Waals fluid. Other horizontal segments can be drawn at pressures between that of point A and the critical pressure $P_c$ which corresponds to the pressure at the top of the two-phase envelope. This critical pressure is the greatest pressure at which both liquid and vapor can coexist. The critical pressure $P_c$ also corresponds to a critical temperature, $T_c$, the isotherm of which passes through the point at the top of the two-phase envelope. At temperatures above $T_c$, only the gas phase exists, no matter how great the pressure applied.

FIG. 2(b) shows the volume of a typical crosslinked poly(N-isopropylacrylamide) gel plotted versus temperature instead of pressure. The van der Waals gas phase can be thought of as corresponding to a "gel gas" phase, and the van der Waals liquid phase to a "gel liquid" phase. The "gel liquid" phase corresponds to the poly(N-isopropylacrylamide) gel in its "collapsed" state, while the "gel gas" phase represents the poly(N-isopropylacrylamide) gel in its "swollen" state. Thus, when processing temperatures are near the gel's critical temperature, i.e., its LCST, the collapsing and swelling of the gel can occur within very narrow temperature ranges and can be discontinuous.

The dramatic effect of temperature on the expansion and contraction of crosslinked N-substituted polyacrylamide gels was carefully studied by R. Freitas and E. Cussler, Chem. Eng. Science, 42, 97 (1987). The authors reported that crosslinked poly(N-isopropylacrylamide) gels and crosslinked copolymers of 97% N,N-diethylacrylamide and 3% sodium methacrylate which are swollen to equilibrium in water at 25° C. collapse abruptly when heated to 33° C. and to near 55° C., respectively. The polymer has a natural limit as to water uptake, leaving excess water and water soluble materials as free water or in solution. In actual use, excess water should be present in order to obtain a retentate concentrated in protein (or whatever high molecular weight entities one may wish to concentrate), and of relatively low concentration of small molecular weight moieties.

These temperature sensitive gels have been used to concentrate macromolecular solutions, including those of proteins. In general, solutes with molecular weights above $10^4$ daltons are completely excluded by the gels, and solutes with molecular weights below $10^3$ daltons diffuse freely into the gels. (See S. H. Gehrke et al., Chem. Eng. Science, 41, 2153 (1987)). However, the protein concentration experiments published to date have been in highly idealized model systems, often containing only one protein or a few low molecular weight solutes, all at high dilution. The few published experiments made under relatively high concentrations show poor separation. Moreover, changes in pH and ionic strength can cause different, sometimes unexpected phase transitions. For example, when using poly(N-isopropylacrylamide) gel to concentrate gelatin from solution, the average efficiency (efficiency being defined as concentration increase measured in solution divided by that expected from the altered solution volume) observed for 0.5 wt-% solutions of gelatin was above 95%. However, for a solution containing 5 wt-% gelatin, the separation efficiency was only 60%. The reduced separation efficiency was attributed to small amounts of solution or "raffinate" becoming trapped between the particles of swollen gel or adsorbed onto the gel particle surfaces. In the existing processes using acid precipitation, the protein concentration in the clarified mother liquor can be in the range of 5 wt-%, and the concentration of non-protein solubles is about 3 wt.-%. Following the acid precipitation step, less than about 90% of the total protein in the mother liquor is recovered as the curd.

Therefore, there is a need for a soy protein isolation process which not only concentrates the acid-soluble proteins, presently not recovered by the acid-based method, but also which achieves a greater separation efficiency for feed solutions more highly concentrated in protein. Such an isolation process would result in improved economics, alleviate waste disposal problems, and provide products with improved functional characteristics and nutritional value.

SUMMARY OF THE INVENTION

The present invention provides a method to increase the concentration and purification of dispersible soy proteins such as the protein extracts obtained from defatted soy flakes. By exploiting the phase transition behavior of crosslinked N-substituted polyacrylamide gels, the present invention avoids the acid-based precipitation step of the existing process which fails to isolate many of the valuable and available proteins. The protein isolate produced using the gel process of the present invention contains the albumins and other acid soluble proteins normally lost in the whey. It also contains much less phytin than does the isolate produced by the conventional route.

The way in which the gel is used in the present invention is shown schematically in FIG. 3. First, the protein solution obtained from aqueous extraction of the flakes is added to the collapsed gel. Second, the system is cooled so that the gel swells to absorb water and other small solutes, but does not absorb high molecular weight solutes such as proteins. Third, the swollen gel and the unabsorbed solution (or "retentate") are separated. The retentate may be subjected to further treatment with gel and the process repeated several times in order to reach the desired protein concentration and purity. The final retentate, a concentrated protein solution, may be spray-dried as in the conventional process, or the protein dispersion may be used as a liquid if so desired.

The gel is preferably recovered and reused. For example, a crosslinked N-substituted polyacrylamide gel can be used wherein the swelling and contraction both occur discontinuously over a narrow temperature range. Preferably a swelling temperature is used which is only slightly below the LCST, and a shrinking temperature is used which is only slightly above the LCST. For example, at 30° C., the gel is swollen to about 30 times its dry weight. At 35° C., however, the gel is swollen only to about three to four times its dry weight. The gel can be warmed by using waste heat, such as that present in the effluent from electric power generation, or from other heat exchange processes. This gel regeneration, shown schematically as the fourth step in FIG. 3, produces a suspension of collapsed gel in whey. In the fifth step, this suspension is separated to recover the warm, collapsed gel and the whey containing low molecular solutes. The whey may be discarded to sewage treatment, or concentrated to be used for other purposes. In the sixth and final step, the gel is cooled, and hence is ready to absorb fresh solution in the next cycle of the process.

More specifically, the present method comprises the steps of:

a. mixing an aqueous solution comprising soy proteins, carbohydrates, minerals and phytins, with a crosslinked polymer gel selected from the group consisting of N-substituted polyacrylamides and copolymers of N-substituted polyacrylamides;

b. swelling the gel to absorb a portion of the water and the soluble carbohydrates, minerals, and phytins from the solution by substantially maintaining the temperature of the gel at a preselected temperature below the lower critical solution temperature of the gel, to yield a concentrated soy protein solution;

c. separating the concentrated soy protein solution from the swollen gel; and d. washing the swollen gel with water having a temperature at or below said preselected temperature, to yield a wash solution which is combined with the concentrated soy protein solution.

Optionally, the present method further comprises the step of:

e. drying the combined wash and concentrated soy protein solutions to yield a concentrated soy protein isolate.

Preferably, the present method also comprises at least one step wherein the swollen gel is shrunk to return it to about its original collapsed volume so that it can be reused. Therefore, the present method can further comprise the steps of:

f. warming the swollen gel to a temperature above the lower critical solution temperature of the gel, so that the gel undergoes a phase change and shrinks to a reduced volume, to release a major portion of the absorbed water and water soluble low molecular weight solutes including carbohydrates, minerals, and phytins; and g. separating the water and the other water soluble low molecular weight solutes from the reduced volume gel.

Combining the wash solution and the concentrated soy protein solution redilutes the soy protein solution, so steps (a)-(d) primarily purify, rather than concentrate the soy protein. Therefore, it is preferable to perform a second concentration step, wherein the combined wash and soy protein solutions are concentrated by exposing them to the reduced volume gel recovered in step (g) above. Therefore, omitting step (e), the present method further comprises the steps of:

e. mixing the combined wash and concentrated soy protein solution of step (d) with the reduced volume gel of step (g) and maintaining the mixture at a temperature below the lower critical solution temperature of the gel, to swell the gel and to absorb a further portion of the water by the gel to yield a further concentrated soy protein solution; and f. separating the further concentrated soy protein solution from the swollen gel.

Optionally, the present method may further comprise the step of:

g. drying the further concentrated soy protein solution to yield a soy protein concentrate.

Steps (e) and (f) effectively accomplish the concentration of the solution of purified protein which is produced in steps (a)-(d) above. It has also been found preferable to add a minor but effective amount of an anti-foaming agent to the water used to wash the swollen gel in step (d).

Depending on the purity desired and on the solids concentration desired for spray drying, the retentate may be subjected to further treatment with the collapsed gel as described in steps (a)-(f) prior to the drying step (g).

The present invention is advantageous because the resulting soy protein isolate contains the albumins and other acid-soluble proteins normally lost in the whey during the existing acid-based precipitation process. These unprecipitated proteins represent about 10% of the dispersible proteins present in the mother liquor of the existing process.

Another advantage of the present invention is that the soy protein isolate obtained from the method contains much less phytin (the insoluble magnesium-, calcium-, and potassium-complexed salt of phytic acid) than the protein isolate produced by existing methods. The present method is also advantageous in that it achieves a higher separation efficiency for concentrated feed solutions than prior gel-based separation attempts due to the added steps of washing the swollen gel to remove entrained or surface-adsorbed protein, and of adding anti-foaming agent to control foaming during the washing step.

Another advantage of the present invention is that since low temperatures can be used for the concentration process, there is little concern for microbiological spoilage and high count final products. Estimating a bacterial count of 1000/ml after one hour of processing (which would not be considered high), the mother liquor can be held at a temperature of about 40° F. (about 5° C.) for 24 hours or more, with no deleterious increase in microbial population. In the gel swelling step exemplified herein, temperatures in the area of about 40° F. (about 5° C.) were used. These temperatures did not adversely affect the rate of swelling but would be expected to alleviate microbiological problems.

A further advantage of the present method is that the gels used can be regenerated easily and inexpensively, thus making the present method much more economical than the past applications of non-reusable gels. (See Flodin et al., *Nature*, 188, 493 (1960); Jacobson et al., *Science*, 195, 302 (1977); Anderson et al., *Anal. Biochem.*, 95, 48 (1979); Vartak et al., *Anal. Biochem.*, 133, 260 (1983)).

DETAILED DESCRIPTION OF THE INVENTION

The Polyacrylamide Gels

Figure 1:
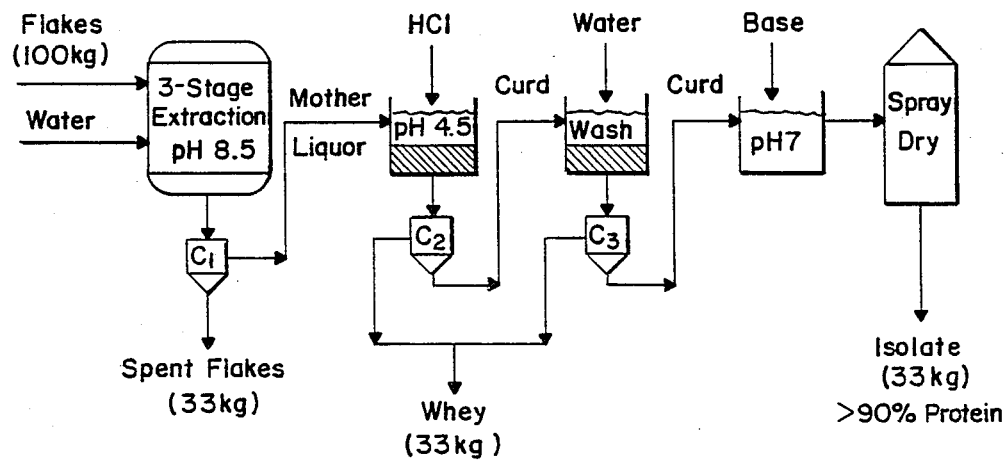
FIG. 1 is a schematic depiction of the existing acid precipitation process for isolating soy protein.

The present invention utilizes crosslinked N-substituted polyacrylamide gels which undergo a large, and preferably abrupt, volume change over a relatively narrow temperature range. Useful polymers of N-substituted polyacrylamide include those of general formula $[-CH_2-CHRCONR'R''-]_n[-A-]_m[-B-]_p$, wherein R is H or $C_1-C_5$ alkyl, R' is H or $C_2-C_5$ alkyl, and R'' is $C_{2-}C_5$ alkyl. Preferably R is H or $CH_3$, and R' and R'' are $(C_2-C_4)$ alkyl. The moiety —A— is optional, and is derived from a hydrophilic monomer such as an alpha,beta-unsaturated carboxylic acid, e.g., acrylic acid, methacrylic acid, itaconic acid or a salt thereof. Preferably, —A— will be present in a minor amount with respect to the entire polymer, e.g., about 1-5 mol-%.

The moiety —B— is derived from a monomeric bisfunctional crosslinking agent such as N,N-methylenebisacrylamide, 1,2-ethylenediacrylate and the like. The crosslinking agent —B— is preferably present at about 0.5-10 mol-% of the entire polymer.

Preferred N-substituted polyacrylamides include substantially hydrophobic polymers such as poly(N,N-diethylacrylamide), poly(N-isopropylacrylamide), poly(N-ethylacrylamide) and poly(N-ethylmethacrylamide), as well as the copolymers thereof. In the general formula presented above, the subscript "m" may have a value of zero, and the values of the subscripts "n", "m" and "p" may vary widely, in accord with the mol-percentages of —A— and —B— given above, so long as the gel functions satisfactorily, e.g., possesses an LCST. In some cases, the gels may be ionic, but the ionic character is not necessary for the process to work. The polymerization conditions of the gel can be manipulated to change the maximum diameter for permeation, thus setting a lower size limit on excluded solutes of about 10 Å.

One gel was prepared from N-isopropylacrylamide using the crosslinker N,N-methylenebisacrylamide. This nonionic gel was first cut into small pieces. When placed in water at 25° C., the gel swelled to 30 times its dry weight. When placed in water at 35° C., however, it swelled to only 3 times its dry weight. Most of this change in swelling took place between 32° C. and 34° C.

A second gel was prepared by copolymerizing 97 mol-% N,N-diethylacrylamide and 3 mol-% sodium methacrylate in the presence of a minor amount of N,N-methylenebisacrylamide. This partially ionic gel was also cut into small pieces. When placed in water at 25° C., the gel swelled to 50 times its dry weight, but when it was placed in water at 55° C., it swelled to only 6 times its dry weight. At 60° C., the gel's volume was only 5% that at 30° C. Most of this altered swelling occurred between 48° C. and 52° C. Thus, minor changes in the chemical composition of the gel can alter the temperature range over which the amount of swelling of the gel changes abruptly.

Preparation of the Soy Protein Solution

The feed solution of the present invention is an aqueous solution derived from the extraction of defatted soy flakes. Such extracts can be prepared by slurrying defatted soy flakes in an excess of water under ambient conditions. The soy flakes contain approximately 45 wt-% soluble protein. To solubilize as much of this protein as possible, an appropriate alkali is added in an amount effective to maintain the slurry of water and flakes at a pH of about 7.5 to 9.0. After an appropriate time, the slurry is centrifuged to obtain a mother liquor (feed solution) and wet spent flakes. cl Exposure of the Gel to the Soy Protein Solution Measured amounts of the dried gel can be contained, for example in screen baskets, for use in a small-scale separation process. The baskets fit loosely into a larger container holding the feed solution. The basket ends are capped with removable fittings which position a stainless steel rod down the center of the basket. The rod has impellers which can be turned within the basket in order to stir the gel during the swelling steps.

In all experiments the amounts of gel and feed solution are adjusted so that about half of the feed solution is absorbed by the gel in each swelling cycle. About 5-8 parts of solution to one part of gel can be used.

Gel Swelling

Gel swelling is preferably performed at a temperature of about 4°-10° C., increasing the volume of the dry gel by about 500-1000%. The gel swells as it absorbs the water, sugars, salts, phytins, and other lower molecular weight solutes present in the feed solution. The gel's crosslinked structure, while permitting these smaller solutes to be absorbed, does not permit the higher molecular weight solutes such as protein to enter, and thus concentrates the higher molecular weight solutes in the remaining solution.

After the gel has absorbed water and lower molecular weight solutes, the liquid fraction, or retentate, is separated from the swollen gel. For example, the basket containing the swollen gel can be spun to remove the retentate which has been concentrated in soy protein and other higher molecular weight solutes.

In order to regenerate and reuse the gel, the volume of the separated gel is reduced (i.e., the gel is "collapsed") by warming the gel to about 37°-42° C. This collapsing occurs very rapidly once the LCST of the gel is reached, e.g., within a few seconds. The gel volume is preferably reduced to about 5-20% of its swollen volume. Preferably, the temperature range separating the swelling temperature from the shrinking temperature is small, e.g., about 1°–10° C., most preferably about 2°–7° C.

The gel may be washed with cool water before it is collapsed, in order to remove additional concentrated soy protein solution which has become entrapped between the gel particles or absorbed onto their surfaces. The wash water temperature must be low enough to prevent collapse of the gel (20°–30° C.). Excessive foaming caused by the concentration and washing steps can be controlled by the addition of an anti-foam agent to the wash water.

Large-Scale Concentration

Figure 4:
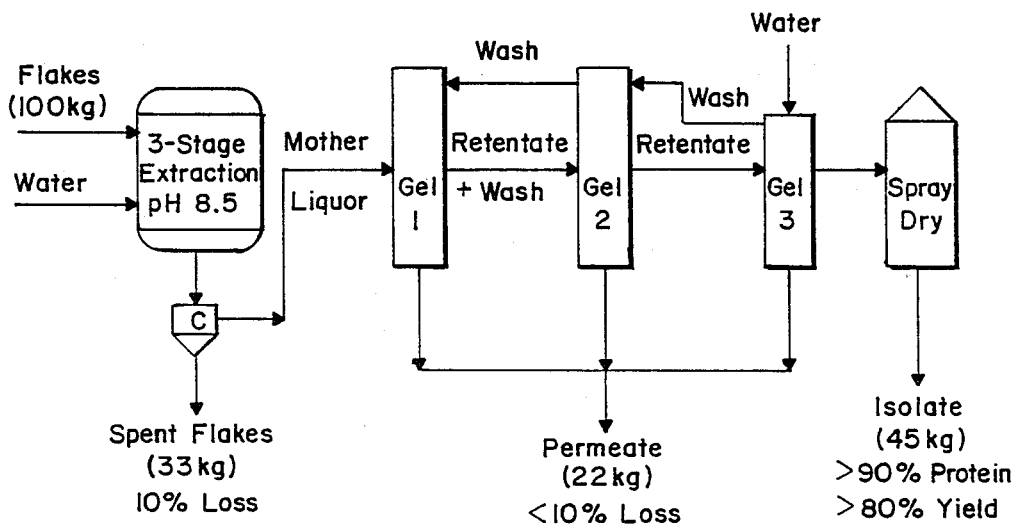
FIG. 4 schematically depicts the present method carried out as a large-scale concentration process.
Figure 2:
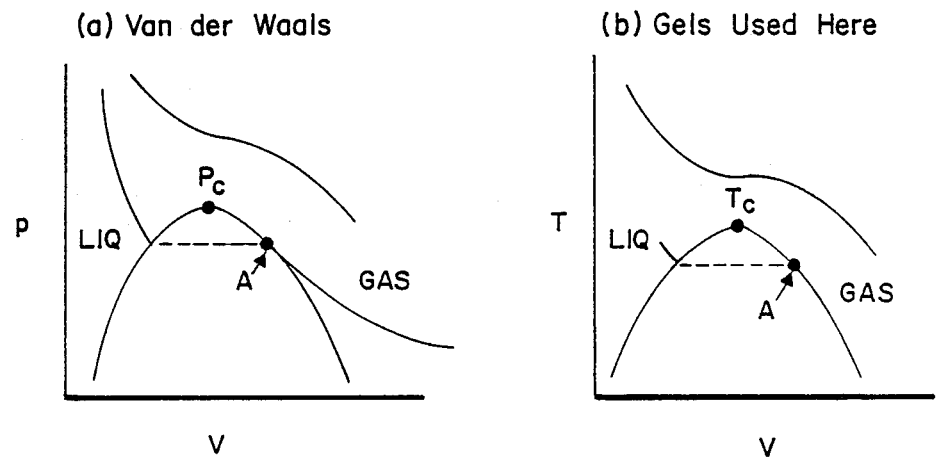
FIG. 2 compares the phase transition behavior of the gels utilized in the present invention to that of a Van der Waals fluid.

The present method can be carried out on a large scale as shown in FIG. 4. The protein-concentrated mother liquor is produced via a three-stage counter-current extraction by the general steps shown in FIG. 1. As shown in FIG. 4, protein in this mother liquor largely moves from left to right through three gel extraction stages. Each of these stages operates on a cycle which includes the steps of swelling the gel, separating it from the concentrated soy protein solution or retentate, washing the gel with water, and combining the wash water with the retentate. The wash water and retentate are then delivered to the next gel extraction stage, so that each stage further purifies the soy protein retentate fed to it from the preceding stage. The retentate from the final stage is spray-dried to yield the soy protein isolate, or can be concentrated by further treatment with the gels if desired.

The invention will be further described by reference to the following detailed examples.

EXAMPLE I

A. Polyacrylamide Gel

Poly(N-isopropylacrylamide) gel was produced by a free radical polymerization at 10° C., as disclosed by Freitas et al., *Chem. Eng. Sci.*, 42, 97 (1987), the disclosure of N-isopropylacrylamide and 0.0792 g of N,N-methylenebisacrylamide are dissolved in 100 ml of distilled water. The solution is cooled in an ice bath and sparged with nitrogen for about 10 minutes. To initiate the polymerization reaction, 0.005 g of ammonium persulfate is added. After an additional 5 minutes of sparging, 0.005 g of sodium metabisulfite is added to complete the initiation. Then the reaction vessel is sealed and the reaction allowed to proceed for about 18 hrs. The resulting gel is cut, collapsed, swollen, and recollapsed several times in pure water in order to remove any unreacted water soluble components, and is dried in a vacuum oven at 50° C. for 10 hrs. In practice, the wet gel, cut to desired size, may be collapsed for use without drying.

B. Separation Apparatus

Measured amounts of the gel are then placed inside cylindrical, 40 mesh screen baskets (2 cm × 30 cm) for use in the separation process. The basket ends are capped with removable fittings which hold a stainless steel rod down the center of the basket. The rod has impellers which can be rotated within the basket to stir the gel during swelling.

The baskets fit loosely into a graduated cylinder containing a feed solution of clarified soy flake extract (mother liquor) or retentate.

C. Soy Extract

Clarified soy protein extracts were prepared by slowly stirring one part of defatted soy flakes, (90 PDI, Honeymead Products Company, Mankato, Minn. in eight parts of water for thirty minutes. The flakes contain approximately 45% by weight of soluble protein. To solubilize as much protein as possible, the pH is maintained in the range of 8 to 8.5 by adding 1.0N NaOH. About 6 grams of clarified protein extract are produced per gram of flakes, the flakes containing about 5% of the protein and 8% of the total solids in the extract.

D. Gel Swelling

The cage containing the collapsed gel is inserted into a tube having a diameter slightly larger than the cage. The tube contains sufficient mother liquor to cover the cage. The amount of collapsed gel in the cage is adjusted to absorb about half of the water and solutes in the original mother liquor. The tube and cage are placed in a water bath at 5° C. The propeller shaft in the cage is connected to an electric stirring motor, and the speed of the motor is adjusted to stir the gel in the cage so that the gel remains suspended. The swelling time associated with the particle size of the gel used in this example was about 45 minutes. If the gel particle size is smaller, the time required to obtain the desired swelling is less.

After swelling, the basket is spun to remove spent solution ("retentate"). The separated swollen gel is collapsed in a second bath at 40° C. In some experiments the swollen gel was washed with water before collapse to recover protein entrained on or between the gel particles. Excessive foaming during concentrating and washing is controlled with octanol, an anti-foaming agent. In all experiments the amounts of gel and feed solution were adjusted so that about half of the solution was absorbed in each swelling cycle. Total solids are determined by evaporating a weighed sample in vacuo at 80° C. for 10 hrs. Protein concentrations, determined spectrophotometrically (see Ellman, *Anal. Biochem.*, 3, 40 (1962)), agree to within 4% of standard Kjeldahl protein analysis (Medallion Laboratories, Minneapolis, Minn).

E. Results

The results of this work are presented in three sections: (1) the separation efficiency, (2) the effects of feed concentration, and (3) the results of various gel isolation techniques. In the first section, we report the concentration of solutes found in a typical soy extract. We are concerned not only with proteins but with phytins and other smaller solutes. In the second section, we evaluate the gel process using feeds of different protein concentration. We emphasize this because earlier studies showed gelatin separations worked well in dilute solutions, but not in concentrated solutions (see Freitas et al., *Chem. Eng. Sci.*, 42, 97 (1987)). The effect of various process parameters on separation efficiency is presented in the third section.

1. Separation Efficiency

The efficiency of these gel absorptions is defined as the concentration increase measured in solution divided by that expected from the altered solution volume. Ideally, if 50% of the liquid weight of the protein solution is absorbed by the gel, and if analysis shows that the protein concentration in the retentate is double that of the original protein solution submitted to gel treatment, so that all of the original protein is in the retentate and no protein is found in the whey recovered from the collapsed gel, the separation efficiency would be 100%. However, if the protein concentration in the unabsorbed solution or retentate increases by only 1.2 times and 50% of the solution is absorbed, then the efficiency is 1.2/2 or 60%. Less obviously, a solute which freely penetrates the gel should have an unaltered retentate concentration, and hence a separation efficiency of 0%. Thus, separation efficiency is a rough parallel to the percent rejection in ultrafiltration. In other words, the concentration of a solute for which the gel exhibits a zero separation efficiency will be the same in both the absorbed water or whey and in the retentate.

Soy extracts are compositionally complex, and can be idealized as containing five constituents: water-dispersible, acid-precipitable proteins; water-dispersible non-acid- precipitable proteins; sugars; salts, and phytins. The acid-precipitable proteins which are effectively concentrated by the existing commercially-used processes are also efficiently concentrated by the gel process, as shown in Table I.

TABLE I

| Gel Extraction from Dilute Solutions | | | |
|---|---|---|---|
| Solute | Feed Concentration(a) | Typical Retentate Concentration(a,b) | Efficiency |
| Soy Proteins: | | | |
| Precipitate at pH 4.5 | 4.5 | 8.91 | 98% |
| Soluble at pH 4.5 | 0.5 | 0.99 | 98% |
| Low Molecular Weight Solutes: | | | |
| Sugars Phytins Salts | 3.0 | 3.04 | 2% |

(a) The concentrations are expressed in weight percents.
(b) The retentate concentrations shown represent the weight percents in the remaining solution after half the feed volume has been absorbed by the gel.

The acid soluble proteins, which are lost to the whey in the existing processes, are retained and concentrated by the gel process. Because these soluble proteins include albumins and other species which functionally and nutritionally improve the quality of the final isolate, the gel process is substantially better than the existing processes because of improved product quality and increased yields.

Salts, sugars, and phytins are not concentrated by the gel process, as is shown in Table I. Salts and sugars are not concentrated by the existing processes, either. However, phytins are largely precipitated with the protein curd in the existing process. These phytins redissolve at pH 7, and may be an undesirable constituent in the final isolate. Thus phytin removal represents a second advantage of the gel process.

2. Effects of Protein Concentration

Figure 5:
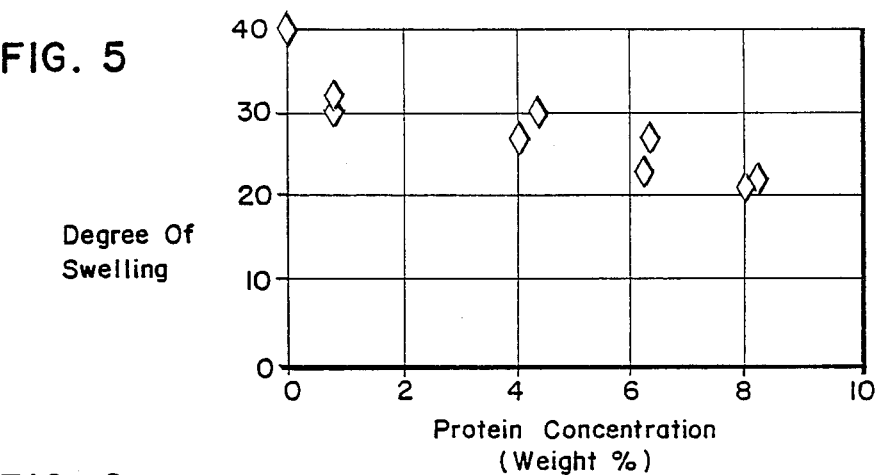
FIG. 5 is a graphic depiction of the swelling behavior of the gels utilized in the present method as a function of protein concentration in the feed.

While the results in Table I are encouraging, they summarize experiments at moderate protein concentrations. Other experiments on model protein solutions also showed good results at very low concentrations, but poor efficiencies at high protein concentrations (see Cussler et al., AIChE J., 30, 578–600 (1984); Freitas et al., Chem. Eng. Sci., 42, 97 (1987)). In order to test performance at higher concentrations, we first recognize that gel swelling is reduced in concentrated solution, as shown in FIG. 5. This reduced swelling probably reflects the lowered water activity in the more concentrated protein solution. However, the solution uptake by the gel in the more concentrated solution remains high, well above ten times the dry gel weight. The change in gel volume also remains large; the increase is more than five times over a five degree temperature range.

Figure 6:
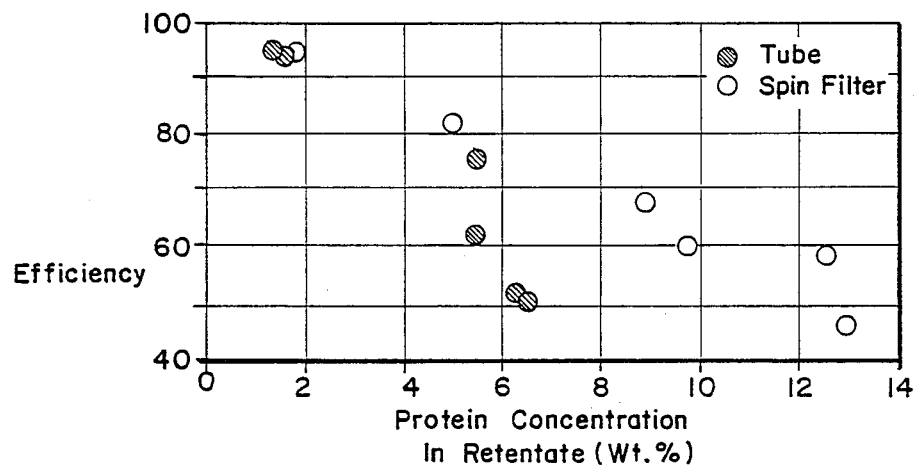
FIG. 6 is a graphic depiction of the efficiency of the present method as a function of increasing protein concentration in the retentate.

The protein separation efficiency at these higher concentrations does drop, however, as shown in FIG. 6. At retentate protein concentrations around 15 wt-%, the efficiency can be half that in dilute solution. This efficiency depends on the method of separating gel and retentate: the efficiency is higher in a spin filter separation than with simple gravity separation or filtration. At the same time, the separation of low molecular weight solutes is unaltered at high feed concentrations. In these experiments, a feed from flake extraction containing both proteins and low molecular weight solutes is used. The concentration of non-protein solutes in the retentate is about equal to that in the feed. In other words, there is almost no concentration; i.e. the separation efficiency is near zero in dilute solution as well as in concentrated solution.

This difference between the protein and the small solute separations is probably due to entrainment of small amounts of retentate between gel particles or adsorbed on the gel particles' surfaces. Indeed, we have found that about 25% of the retained gel mass can be in fact entrained retentate. As the gel swells, excluded protein will form a more concentrated solution at the surface of, and in between the gel particles. If this protein concentrate is not carefully removed, it will compromise efficiency, just as concentration polarization can compromise protein ultrafiltration. On the other hand, small solutes move freely throughout gel and solution, unaffected by protein problems. As a result, we turn next to methods for separating gel and retentate more effectively.

3. Gel Washing

Once we suspected that the reduced efficiency in protein recovery shown in FIG. 6 was due to protein retention near the gel surface, we explored different ways of recovering the adsorbed protein. We found that the use of a simple tube and of a spin filter gave equivalent separation efficiencies, and that these efficiencies were less than those obtained when a centrifuge was utilized (cf. FIG. 7). However, while centrifugation is effective, it is also expensive.

Figure 7:
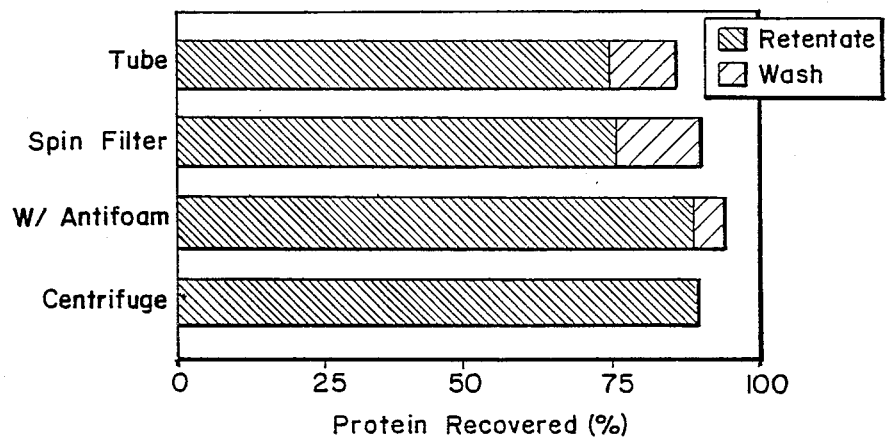
FIG. 7 is a graphic depiction of the efficiency of the present method as a function of various process parameters.

We next found that washing the gel with water increased the efficiency of the protein separation, as also shown in FIG. 7. Because the wash water is cool, gel volume is not appreciably affected. The separation efficiency is still higher when a small amount of octanol or silicone is added as an anti-foaming agent. Thus, the reduced separation efficiency shown in FIG. 6 can be largely overcome by means of careful gel washing.

To test this finding, we carried out a three stage gel extraction. First, we concentrated an extracted soy flake liquor with gel, washed the gel, and combined wash and retentate. Secondly, we repeated the gel extraction using the combined wash and retentate. washed the gel, discarded the wash, but saved the second retentate. Thirdly, we followed the first and second procedures, but concentrated the second retentate without washing.

The results are shown in Table II below.

TABLE II

| Results of Soy Isolate Process Using Gels | | | | |
|---|---|---|---|---|
| | Steps:[1] | | | |
| Clarified Liquor Feed | Retentate (Step 2) | Spent Wash | Permeate (Step 2) | Isolate (Step 3) |
| % Protein 8[2] | 13 | 1 | <1 | 17 |
| % Yield 100 | 86 | 7 | 4 | 79 |

TABLE II-continued

Results of Soy Isolate Process Using Gels

| Clarified Liquor Feed | Steps:[1] | | | |
|---|---|---|---|---|
| | Retentate (Step 2) | Spent Wash | Permeate (Step 2) | Isolate (Step 3) |
| % Purity 67 | 88 | 47 | 28 | 96 |

Figure 3:
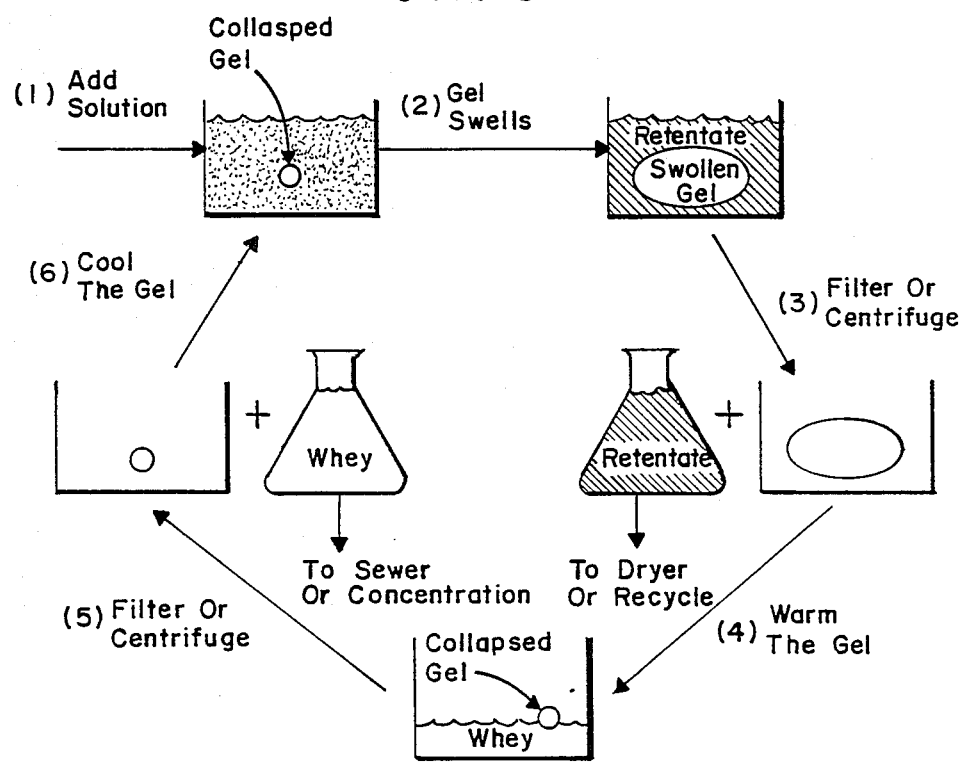
FIG. 3 is a schematic representation of the steps of the present method.

[1]The steps mentioned are those in FIG. 3.
[2]Water:flake ratio was 5:1.

The first step, when retentate and wash are combined, purifies rather than concentrates the protein. The second step, in which wash is discarded, both purifies and concentrates, but sacrifices protein yield. The third step is largely one of concentration, producing a retentate containing 17% solids which are 96% protein on a dry basis. The remaining 4% of solids are largely soluble carbohydrates and minerals. This isolate has a protein content similar to that of the existing process, but its yield from the initial flake is higher and some functional characteristics will be improved.

We can estimate the performance of the process in FIG. 4 using the data given above. Details of these estimates are given elsewhere (see Trank, "Design and Application of Temperature-Sensitive Gels," Ph.D. thesis, University of Minnesota, 1988). If we assume again a starting unit of 100 kg of moisture free flakes, we produce about 33 kg of spent flakes, just as in FIG. 1. These spent flakes contain about the same amount of protein as in the existing processes. On the basis of Table II, we expect that the final protein isolate will yield about 40–45 kg of solids, in comparison to about 30–36 kg yelded by the conventional process. This isolate will include more than 80% of the protein in the original flake, will be more than 90% pure, and will include the soluble proteins lost to the whey in the existing process.

In the FIG. 4 process, we will lose about 22 kg of the solids to the whey. Most of these lost solids will be soluble carbohydrates and minerals, but will also include phytins which are co-precipitated with the protein in the existing processes. The protein lost to the whey, which should be less than 5% of the protein in the mother liquor, will constitute the small fraction entrained after gel washing and exuded during gel regeneration.

We believe that the new process has additional advantages. It separates the protein at about 4°–5° C., and hence inhibits microbial growth. It should be less expensive than the existing processes because it does not require the use of as many costly high speed centrifuges. Nor does the new process require acid and alkali.

The invention has been described with reference to various specific and preferred embodiments and techniques. However, it should be understood that many variations and modifications may be made while remaining within the spirit and scope of the invention.

What is claimed is:

1. A method for the purification and concentration of soy protein comprising:
    (a) mixing an aqueous solution comprising soy protein and phytin with a solid crosslinked polymer gel selected from the group consisting of N-substituted polyacrylamides and copolymers of N-substituted polyacrylamides;
    (b) swelling said gel to absorb a portion of the water and of said phytin from said aqueous solution by substantially maintaining the temperature of said gel at a preselected temperature below the lower critical solution temperature of said gel, to yield a concentrated soy protein solution as a retentate;
    (c) separating said concentrated soy protein solution from said swollen gel; and
    (d) washing said swollen gel with water having a temperature at or below said preselected temperature, to yield a wash solution which is combined with said concentrated soy protein solution to yield a concentrated soy protein dispersion.

2. The method of claim 1 further comprising:
    (e) drying the concentrated soy protein dispersion to yield a concentrated soy protein isolate.

3. The method of claim 1 wherein said crosslinked polymer gel is in particulate form.

4. The method of claim 1 wherein said crosslinked polymer gel swells to at least 5 times its initial volume.

5. The method of claim 1 wherein said crosslinked polymer gel is swollen and collapsed over an about 5° C. range.

6. The method of claim 1 wherein said crosslnked polymer gel is a poly(N-isopropylacrylamide) gel.

7. The method of claim 6 wherein said crosslinked polymer igel is apoly(N-isopropylacrylamide) crosslinked with N,N-methylenebisacrylamide and is swollen at about 25°–32° C.

8. The method of claim 1 wherein the soy protein concentration in said aqueous solution comprising soy prctein and phytin is about 10–20 wt-%.

9. The method of claim 1 wherein said gel of step (b) is swollen at about 4°–10° C.

10. The method of claim 1 wherein said crosslinked polymer gel is a copolymer of poly(N,N-diethylacrylamide) and sodium methacrylate crosslinked with N,N-methylenebisacrylamide, and is swollen at about 25°–55° C.

11. The method of claim 1, further comprising:
    (e) warming said swollen gel of step (c) to a temperature above said lower critical solution temperature of said gel, so that said gel undergoes a phase change and shrinks to a reduced volume, to release a major portion of said absorbed water and said absorbed phytin; and
    (f) separating said released water and said released phytin from said reduced volume gel.

12. The method of claim 11 wherein the volume of said reduced volume gel is about 5–20% of the volume of said swollen gel.

13. The method of claim 11 wherein said crosslinked polymer gel is a poly(N-isopropylacrylamide) gel.

14. The method of claim 1, further comprising:
    (e) mixing said combined solution of said wash solution and said concentrated soy protein solution with said reduced volume gel and maintaining the mixture at a preselected temperature below said lower critical solution temperature of said gel, to swell said gel and to absorb a further portion of said water by said gel to yield a further concentrated soy protein solution; and
    (f) separating said further concentrated soy protein solution from said swollen gel.

15. The method of claim 14, further comprising:
    (g) drying said separated further concentrated soy protein solution to yield a further concentrated soy protein isolate.

* * * * *

UNITED STATES PATENT AND TRADEMARK OFFICE
CERTIFICATE OF CORRECTION

PATENT NO. : 4,863,613
DATED : September 5, 1989
INVENTOR(S) : Dale W. Johnson, Edward L. Cussler and Steven J. Trank It is certified that error appears in the above-identified patent and that said Letters Patent is hereby corrected as shown below:

At Col. 7, line 35, for "$C_{2-C5}$" read --$C_2$-$C_5$--.

At Col. 9, line 39, after "sure of" insert --which is incorporated by reference herein. Briefly, 7.92g of--.

At Col. 10, line 10, for "Swellinq" read --Swelling--.

At Col. 10, line 56, for "Efficiencv" read --Efficiency--.

At Col. 14, line 25, for "igel" read --gel--.

At col. 14, line 25, for "apoly" read --a poly--.

Signed and Sealed this

Twentieth Day of November, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,863,613

DATED : September 5, 1989

INVENTOR(S) : Dale W. Johnson et al.

It is certified that error appears in the above-identified patent and that said Letters Patent is hereby corrected as shown below:

At column 1, before the section "TECHNICAL FIELD OF THE INVENTION", insert the following section:

--GOVERNMENT SUPPORT
This invention was made with government support under CPE 840899 and CPE 8611646 awarded by the National Science Foundation. The government has certain rights in the invention.--

Signed and Sealed this

Twenty-seventh Day of February, 1996

*Attest:*

BRUCE LEHMAN

*Attesting Officer*     *Commissioner of Patents and Trademarks*